Jan. 7, 1930.   D. L. NEWTON   1,742,720
HINGE BASE FOR TANKS AND THE LIKE
Filed Dec. 29, 1926
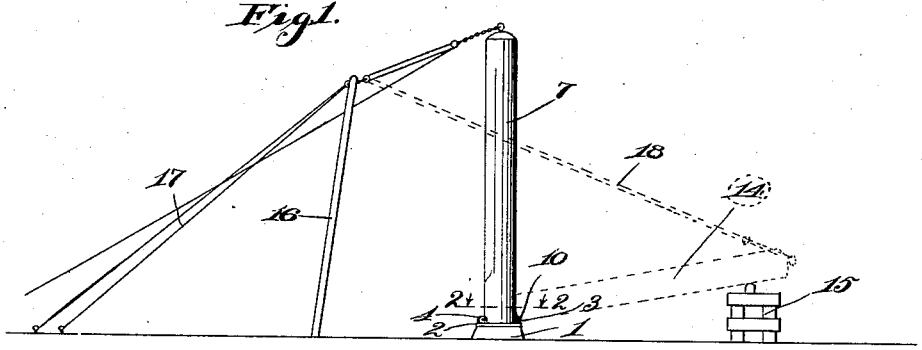
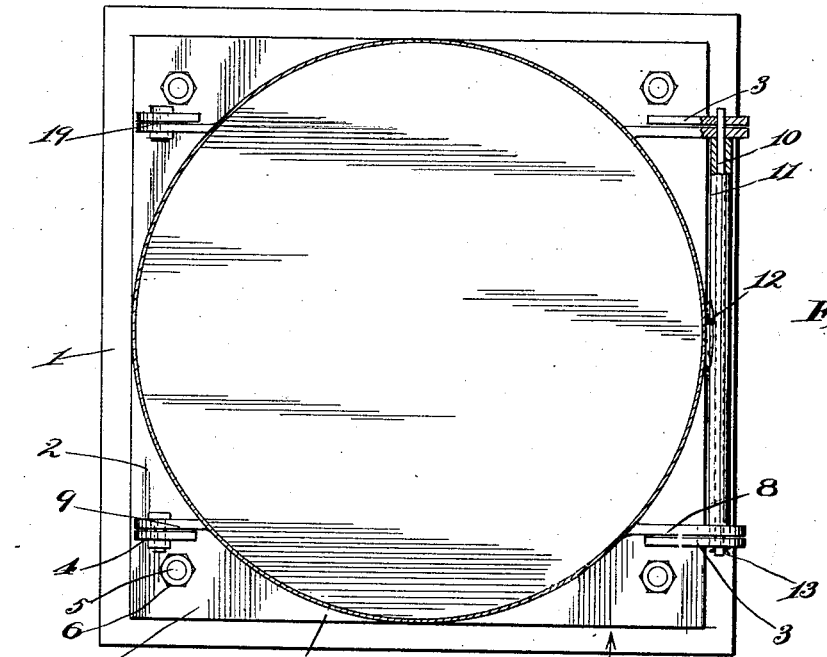
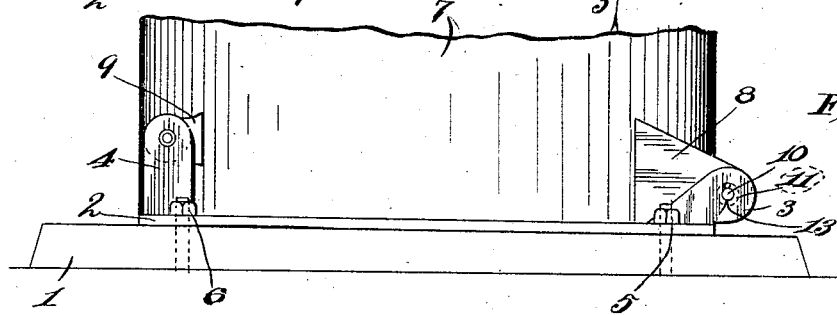
Inventor
D. L. Newton
by Hazard &
Miller
Att'ys Patented Jan. 7, 1930

1,742,720

UNITED STATES PATENT OFFICE

DANIEL L. NEWTON, OF FULLERTON, CALIFORNIA, ASSIGNOR TO NEWTON PROCESS MANUFACTURING CO., OF FULLERTON, CALIFORNIA, A CORPORATION OF CALIFORNIA

HINGE BASE FOR TANKS AND THE LIKE

Application filed December 29, 1926. Serial No. 157,819.

My invention is a hinge base for tanks and the like and in the method of erecting tanks.

My invention pertains to a construction of tanks, facilitating the raising of same, and is particularly adapted for tanks which are of a considerable height in reference to their base measurements. The tank and base are provided with a hinge connection so that the lower end of the tank may be hinged to the base or base plate and then by suitable tackle erected into a vertical position and, after such erection, be bolted to the base. The base plate of the tank is preferably square and the usual tanks are cylindrical. A pair of lugs are welded to the base plate and a pair of heavy ears welded to the sides of the tank. A pivot pin with a spacer surrounding same secures the lugs and the ears together, and the spacer is welded to the side of the tank, thus making a rigid connection and allowing the tank to be raised in any suitable manner. After erection the opposite side of the tank is bolted to the base plate. If the tank cannot be raised on account of other obstructions and the like into the position which it is finally to occupy, it may be hauled to the base from any suitable quarter and, after being raised to a vertical position on the base plate, the base plate and tank may be turned to occupy the desired position.

My invention will be more readily understood from the following description and drawings, in which:

Figure 1 is a diagrammatical side elevation showing the manner of erecting the tank.

Figure 2 is an enlarged horizontal section on the line 2—2 of Fig. 1 in the direction of the arrows.

Figure 3 is a side elevation of the lower part of the tank, the base plate, and part of the foundation, as if taken in the direction of the arrow 3 of Fig. 2.

In the drawings the foundation is indicated by the numeral 1 and may be of any suitable material and shape to support the tank. A base plate 2 is illustrated as being of rectangular shape and has a pair of lugs 3 welded thereto on one side. These lugs project over the side of the base plate, as clearly indicated in Figs. 2 and 3. A pair of bolting plates 4 are welded to the other side of the base plate and extend vertically. The base plate is bolted to the foundation by anchor bolts 5 or the like, the nuts being indicated by the numeral 6.

The tank 7 is illustrated as being a cylindrical structure and is preferably closed at the top and bottom and provided with any suitable inlet and outlet. A pair of ears 8 are welded to the tank. A pair of plates 9 are also welded to the opposite side of the tank. A pivot pin 10 extends through the lugs 3 and the ears 8 and is surrounded by a spacer 11 between the ears. This spacer is welded to the wall of the tank, as indicated by the numeral 12. The pivot pin is retained in position in any suitable manner, as by the cotter pins 13.

The manner of erection of the tank is substantially as follows:

The foundation is built of any suitable material and the base plate is rested thereon. The tank is drawn to the position, as indicated dotted by the numeral 14 in Fig. 1, with the pivot pin inserted through the lugs 3 and ears 8, as above mentioned, and with the upper end of the tank resting on a cribbing 15. A strain pole 16 is erected, having guy lines 17, and a suitable tackle 18 is connected from the top of the tower to the top of the strain pole and thence to any suitable pulling mechanism. The tank is then elevated from the substantially horizontal position to the vertical position, as shown by the full lines in Fig. 1, and when in such position the bolts 19 are inserted through the bolting plates 4 and the plates 9, thus securely clamping the tank to the base plate, the pivot pin holding the tank on the opposite side. If the tank is not in the position desired for its permanent mounting, the base plate with the tank thereon may be bodily lifted and rotated on a vertical axis until in the desired position, when the tank and the base plate would be lowered, the base plate being secured to the foundation by the anchor bolts 5.

From the above description it will be seen I have developed a tank having a hinge base and a bolting means therefor which readily allows a tank of considerable weight to be elevated from a substantially horizontal position and readily clamped to a base plate, and also that I have invented a method of erecting tanks.

Various changes may be made in the principles of my invention without departing from the spirit thereof, as set forth in the description, drawings and claims.

I claim:

1. The method of erecting tanks comprising hinging a tank adjacent its base to a base plate, the tank being positioned substantially horizontally, raising the tank to a vertical position, and bolting the other side of the tank to a base plate, and rotating the base plate and tank to a desired position on a foundation.

2. In an apparatus for erecting and installing tanks, a base plate adapted to rest on a horizontal base, having a pair of lugs extending upwardly therefrom on one side, a cylindrical tank having a pair of projecting ears from one side, a pivot pin extending through the lugs and the ears, and means to bolt the opposite side of the tank to the base plate in a vertical position.

3. In an apparatus for erecting and installing tanks, the combination of a base plate adapted to rest on a horizontal base, having a pair of lugs extending upwardly therefrom, a cylindrical tank having a pair of ears projecting from one side, a pivot pin extending through the lugs and the ears, and having a spacer surrounding same, the spacer being secured to the wall of the tank adjacent its base, and means to bolt the other side of the tank to the base plate in a vertical position.

4. In an apparatus for erecting and installing tanks, the combination of a base plate adapted to rest on a horizontal base and a cylindrical tank, the base plate having a pair of lugs on one side and a pair of vertical bolting plates on the other side, the tank having a pair of ears on one side parallel to the said lugs, a pivot pin through the lugs and the ears with a spacer surrounding the pin, the spacer being secured to the tank adjacent its base, the tank having a pair of plates extending from the side opposite the ears, the plates being parallel to the bolting plates, and bolts therethrough.

5. The method of erecting tanks comprising hinging a tank on one side adjacent its base to a base plate, the tank being positioned substantially horizontally, raising the tank to a vertical position, and bolting the other side of the tank to a base plate.

In testimony whereof I have signed my name to this specification.

DANIEL L. NEWTON.